C. A. HOFFMAN.
EYEGLASS MOUNTING.
APPLICATION FILED MAR. 18, 1905.

960,924.

Patented June 7, 1910.

WITNESSES.
F. O. Tanner
C. G. Harris

INVENTOR
CHARLES A. HOFFMAN.
BY Paul & Paul
HIS ATTORNEYS.

UNITED STATES PATENT OFFICE.

CHARLES A. HOFFMAN, OF MINNEAPOLIS, MINNESOTA.

EYEGLASS-MOUNTING.

960,924.  Specification of Letters Patent.  Patented June 7, 1910.

Application filed March 18, 1905. Serial No. 250,739.

*To all whom it may concern:*

Be it known that I, CHARLES A. HOFFMAN, of Minneapolis, Hennepin county, Minnesota, have invented certain new and useful Improvements in Eyeglass-Mountings, of which the following is a specification.

The object of my invention is to provide an eyeglass mounting in which the use of screws, wedges or similar means for securing the parts together is entirely avoided.

A further object is to provide a mounting that can be easily and quickly adjusted to the contour of the nose.

The invention consists in features hereinafter particularly described and then sought to be clearly defined by the claims.

Figure 1:
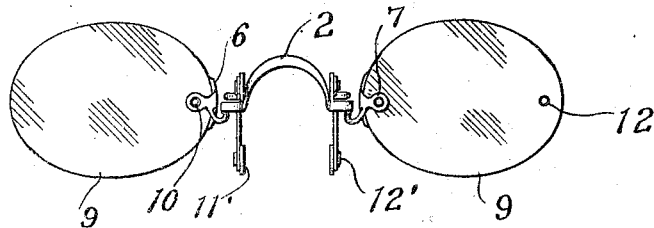
Figure 2:
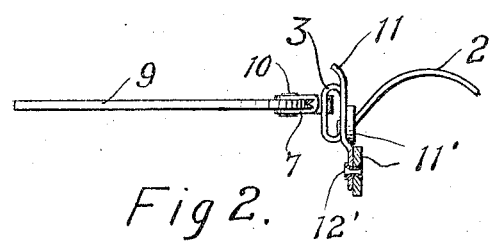
Figure 3:
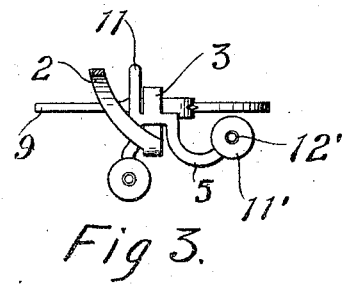
Figure 4:
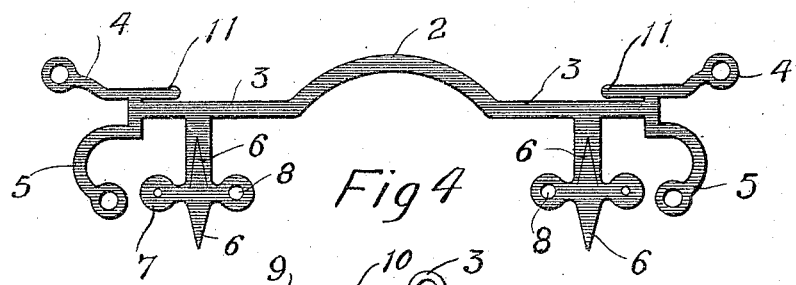
Figure 6:
Figure 5:
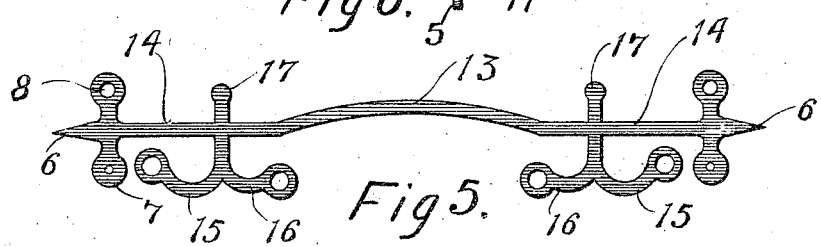

In the accompanying drawings forming part of this specification, Figure 1 is a front view of an eyeglass mounting embodying my invention. Fig. 2 is a top view of the same. Fig. 3 is a view looking toward one of the lens from a section line through the bridge. Fig. 4 is a plan view of the mounting illustrated in Fig. 1 just after it has been cut out and before being bent to form the mounting. Fig. 5 is a similar view of a modified form, the lens clamps and the nose guards being reversed in position. Fig. 6 is a sectional view through the lens showing the manner of securing the clamp thereon.

In the drawing, 2 represents a bridge provided with loops 3 in a plane substantially at right angles to the plane of the lens and having their ends inwardly and backwardly turned and terminating in two-piece nose guards 4 and 5. The loops 3 act as spring supports for the guards to hold them with a yielding pressure on the nose, and are flexed by pressure on the finger pieces in placing the mounting on the nose or removing it. Laterally extending lens clamps are carried by said loops and consist of points 6 which bear on the edges of the lens and ears 7 that straddle the lens edges and have holes 8 through which a fastening means is inserted.

The lenses represented by numeral 9 are provided with the usual perforations, and eyelets 10 pass through these perforations and through the holes in the ears 7, and then have their ends expanded to lock the lens and clamps firmly together avoiding the use of screws or rivets.

The bridge, nose guards and clamps, as shown in Fig. 4, are all stamped out from a single piece of metal, and the bridge is bent into a plane at an angle of from twenty-five to forty-five degrees to the plane of the lens to allow the mounting to be fitted to the contour of the nose and the bridge to rest on the nose or follow its outline in much the same manner as a spectacle bridge.

The bridge and its connections will be made of flexible sheet metal, which will permit of its being bent and adjusted in any desired position to fit the nose of the person for whom the mounting is made. The clamps and guards being formed integrally with the bridge piece will be inseparably attached thereon, and there will be no screws or other means connecting them that are liable to work loose and be lost or cause any annoyance to the person wearing the glasses.

In addition to the nose guards at the end of the pieces 3 I prefer to provide finger pieces 11 projecting inwardly toward the bridge and adapted to be bent forwardly into a convenient position to be grasped by the fingers to flex the loops 3 in placing the mounting on the nose or removing it.

The eyelets used for securing the clamps to the lens are flattened out or expanded at each end in the usual way and form a more secure fastening means than rivets or screws, as their flanged ends have a wider and more substantial grip or hold on the clamps than the heads of rivets would have at that place. These eyelets, hollow rivets or bushings are of comparatively thin material, and are adapted to be spread out or flanged at each end by the pressure of a pair of pliers, or other suitable tool, thereon to lock the clamp and lens together without danger of breaking the lens and without the use of the insecure screw usually employed. I have found that but little pressure will be required on the ends of the bushing to force them out laterally upon the clamp, and these flanged portions of the ends may be easily squeezed together whenever it is desired to detach the clamp from the lens. A rivet has to be headed, and there is always great danger of breaking the lens, and it is a difficult and delicate operation to remove the rivet and detach the clamp from the lens.

In Fig. 3 I have illustrated the nose guards provided with gripping surfaces 11' made of rubber, cork, gutta-percha, or any suitable material, and secured to the guards by little eyelets 12' that have a better grip on the softer bearing surfaces than rivets or screws would have at that point. These eyelets, hollow rivets or bushings are also made of thin material capable of being easily spread out or flanged to engage the surfaces of the guards, and said ends will have a much broader bearing surface on the guards than rivets would have; and consequently there is much less danger of their pulling out through the soft cork of which the guard is usually made.

At the opposite end of the lens from the point where the mounting clamp is secured thereto I provide an eyelet 12 through which the cord is passed that secures the eyeglasses to the person. This eyelet has a smooth interior and end surfaces, and will not cut or fray the cord at the point where it passes through the lens.

In Fig. 5 I have shown a slight modification of the one piece mounting in which the bridge 13 is shown with a less degree of curve, and the lens clamps corresponding to those above described are at the extreme end of the pieces 14 instead of intermediate to said ends and the bridge, as in Fig. 4. The two-piece nose guards 15 and 16 depend from the end pieces 14, and the finger pieces 17 project upwardly from said end pieces and extend forwardly when the mounting is bent into proper form for use to allow them to be conveniently gripped by the fingers in placing the glasses on the nose or removing them.

I claim as my invention:

1. The eye-glass mounting comprising a clamp for each lens, the metal of which the clamps are formed having a portion thereof extended to bear on the edges of lenses and another portion bent substantially at right angles to the plane of the lenses to form a spring loop next to each lens with a part thereof bent to form a nose-guard and another portion to form a bridge connecting the two lens clamps, substantially as described.

2. In a rimless mounting for eyeglasses and spectacles, the combination with the lens strap having a hole therethrough, of a hollow or tubular rivet adapted to extend through said hole to secure the strap to the lens, and having each end enlarged, the material of the rivet where it contacts with the lens having a non-compressing engagement therewith.

3. The combination of a lens, a strap and a hollow rivet having an expanded end for holding said strap to said lens and whereby said end may be easily contracted for removal of said rivet from the lens, said rivet during its attachment retaining its normal size throughout its surface contact with said lens, its expanded part contacting only with said strap whereby breakage of said lens is avoided during the assemblage of the parts.

In witness whereof, I have hereunto set my hand this 7th day of March 1905.

CHARLES A. HOFFMAN.

Witnesses:
RICHARD PAUL,
C. G. HANSON.